(12) United States Patent
Tutzer et al.

(10) Patent No.: US 10,403,943 B2
(45) Date of Patent: Sep. 3, 2019

(54) BATTERY SYSTEM

(71) Applicant: Thunder Power New Energy Vehicle Development Company Limited, Central (HK)

(72) Inventors: Peter Tutzer, Milan (IT); Francesco Mastrandrea, Milan (IT)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 15/675,481

(22) Filed: Aug. 11, 2017

(65) Prior Publication Data

US 2018/0069279 A1    Mar. 8, 2018

Related U.S. Application Data

(60) Provisional application No. 62/384,298, filed on Sep. 7, 2016.

(51) Int. Cl.
*H01M 10/613* (2014.01)
*H01M 10/0525* (2010.01)
(Continued)

(52) U.S. Cl.
CPC ....... *H01M 10/613* (2015.04); *H01M 2/1072* (2013.01); *H01M 2/206* (2013.01); *H01M 10/0525* (2013.01); *H01M 10/615* (2015.04); *H01M 10/625* (2015.04); *H01M 10/653* (2015.04); *H01M 10/6552* (2015.04); *H01M 10/6553* (2015.04); *H01M 10/6556* (2015.04); *H01M 10/6567* (2015.04); *H01M 10/643* (2015.04); *H01M 2220/20* (2013.01)

(58) Field of Classification Search
None
See application file for complete search history.

(56) References Cited

U.S. PATENT DOCUMENTS

2002/0022178 A1    2/2002   Asaka et al.
2009/0111009 A1    4/2009   Goesmann et al.
(Continued)

FOREIGN PATENT DOCUMENTS

DE   10 2011 118 686 A1   5/2013
EP         2 339 688 A1   6/2011
(Continued)

OTHER PUBLICATIONS

European Search Report for EP 17189814 dated Nov. 9, 2017, 7 pages.
(Continued)

*Primary Examiner* — Wyatt P McConnell
(74) *Attorney, Agent, or Firm* — Kilpatrick Townsend & Stockton LLP (57) ABSTRACT

A battery system that includes a battery cell. The battery cell defines a proximal end and a distal end where the proximal end is a positive terminal and the distal end is a negative terminal. A first busbar couples to the proximal end and a second busbar couples to the distal end to complete an electrical circuit. A first energy transfer conduit carries a fluid that cools and/or heats the battery cell. The first busbar or the second busbar couple to the first cooling conduit.

20 Claims, 7 Drawing Sheets

(51) Int. Cl.
  *H01M 10/625* (2014.01)
  *H01M 10/6552* (2014.01)
  *H01M 10/6567* (2014.01)
  *H01M 2/10* (2006.01)
  *H01M 2/20* (2006.01)
  *H01M 10/6553* (2014.01)
  *H01M 10/615* (2014.01)
  *H01M 10/653* (2014.01)
  *H01M 10/6556* (2014.01)
  *H01M 10/643* (2014.01)

(56) References Cited

U.S. PATENT DOCUMENTS

| | | |
|---|---|---|
| 2011/0318628 A1 | 12/2011 | Heim |
| 2012/0129017 A1 | 5/2012 | Ota |
| 2013/0065094 A1* | 3/2013 | Kim ................. H01M 2/202 429/50 |
| 2013/0146249 A1 | 6/2013 | Katayama et al. |
| 2014/0113171 A1 | 4/2014 | Schaefer |
| 2015/0171400 A1 | 6/2015 | Shin et al. |
| 2016/0093931 A1 | 3/2016 | Rawlinson et al. |

FOREIGN PATENT DOCUMENTS

| | | |
|---|---|---|
| EP | 2 398 108 A1 | 12/2011 |
| FR | 2 998 421 A1 | 5/2014 |
| JP | 2012 160338 A | 8/2012 |

OTHER PUBLICATIONS

European Search Report for EP 17189818 dated Nov. 28, 2017, 7 pages.
U.S. Appl. No. 15/675,512, filed Aug. 11, 2017, Non-Final Rejection dated Nov. 7, 2017, all pages.

* cited by examiner

FIG.11

BATTERY SYSTEM

CROSS-REFERENCE TO RELATED APPLICATION

The present application is a nonprovisional of and claims priority to U.S. Provisional Application No. 62/384,298, filed Sep. 7, 2016, the entire contents of which are hereby incorporated by reference for all purposes.

FIELD OF THE INVENTION

The disclosure generally relates to a battery system.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electric vehicles are growing in popularity as society becomes more and more concerned about carbon emissions and sustainable/renewable energy sources. Electric vehicles operate using electric power stored in one or more batteries. During operation, the stored electrical energy is controllably released to drive an electric motor. The electric motor converts the electrical energy into mechanical energy, which propels the vehicle. Electric vehicles control the flow of power from the battery with switches. As the battery releases electrical power the internal resistance of the battery creates heat.

SUMMARY OF THE INVENTION

The embodiments discussed below include a battery system for an electric vehicle. The battery system includes first and second busbars that couple to respective positive and negative battery cell terminals. The first and second busbars enable electricity to flow from the battery cells during discharge and electricity to flow to the battery cells during recharge. Coupled to the first and/or second busbars are one or more energy transfer conduits. These energy transfer conduits carry a fluid that enables energy transfer to and/or from the first and second busbars as well as the cells. For example, the fluid flowing through the energy transfer conduits may cool the busbars by removing thermal energy. Likewise, the fluid flowing through the energy transfer conduits may also heat the busbars and/or battery cells. The battery system may therefore regulate the temperature of the battery cells to facilitate battery performance.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
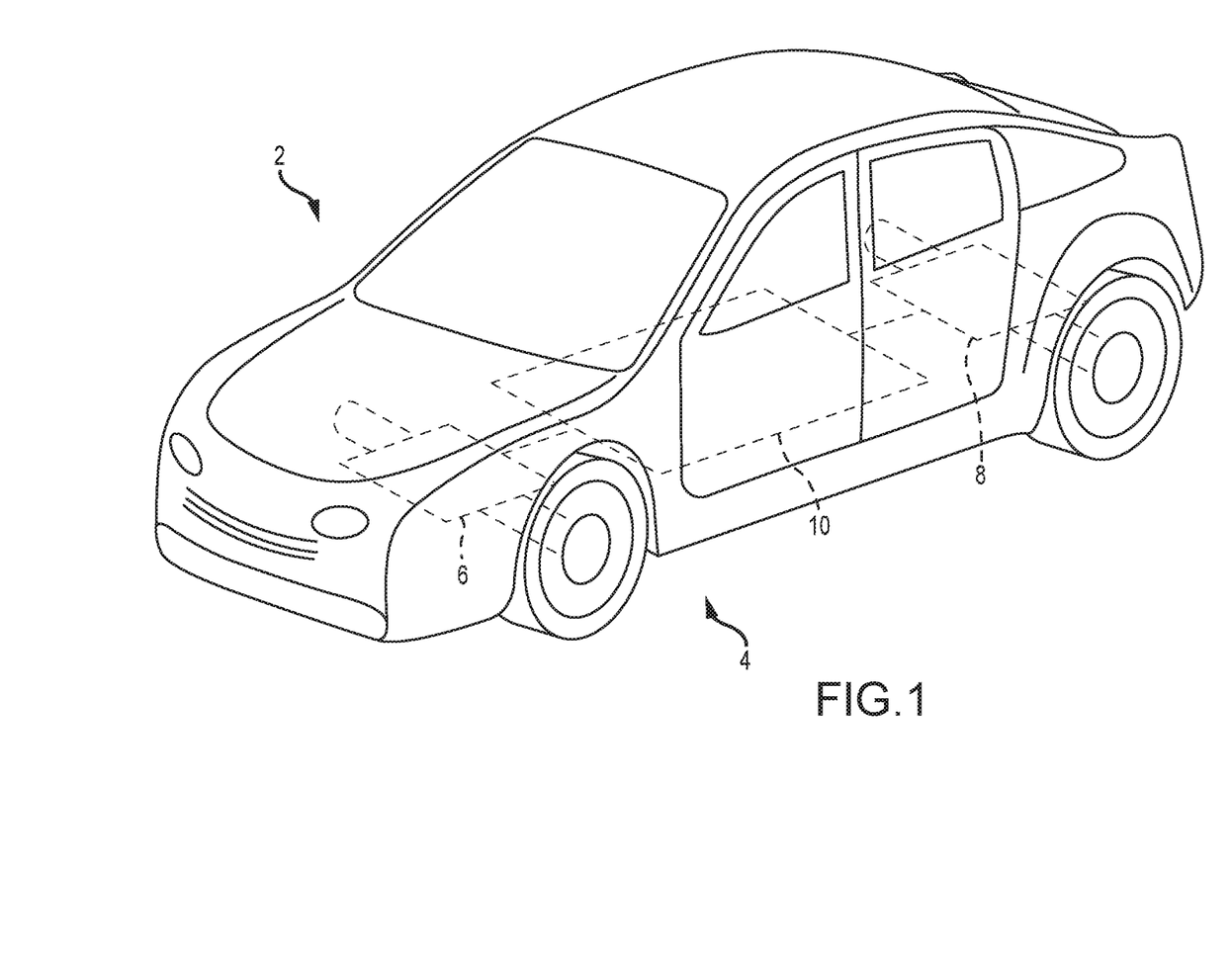
FIG. 1 is a perspective view of an embodiment of an electric vehicle with a powertrain system and a battery system.

FIG. 1 is a perspective view of an electric vehicle 2. The electric vehicle 2 includes an powertrain system 4 which may include a front powertrain 6 and/or a rear powertrain 8. In an embodiment that includes a front and rear powertrain 6, 8, the front powertrain 6 drives the front wheels while the rear powertrain 8 drives the rear wheels. The powertrain system 4 is powered with a battery system 10 that provides power to electric motors in the powertrain system 4. The battery system 10 may also power various onboard systems such as displays, climate control systems, speakers, radios, etc.

Figure 2:
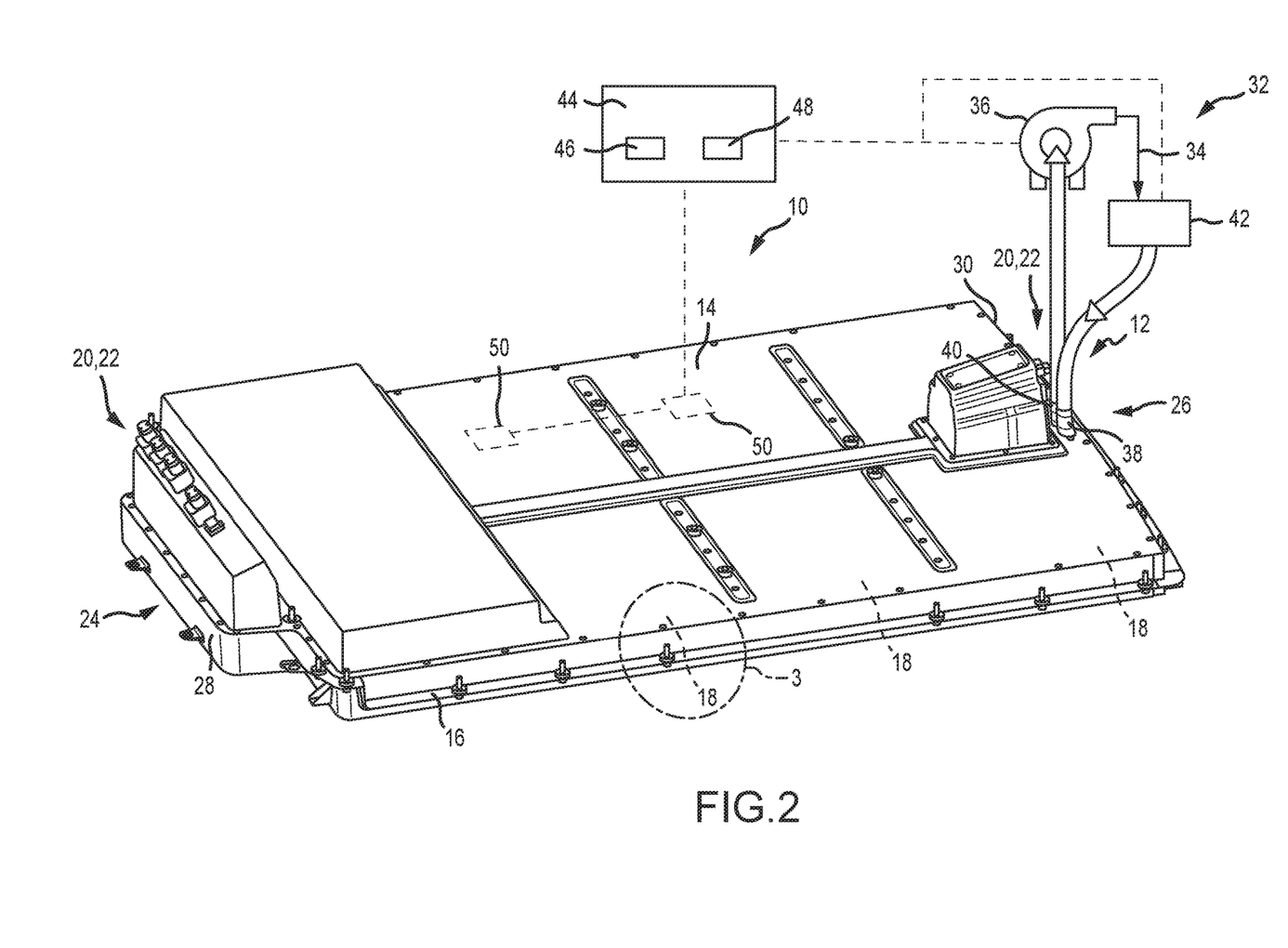
FIG. 2 is a perspective view of an embodiment of an electric vehicle battery system.

FIG. 2 is a perspective view of an embodiment of the battery system 10. The battery system 10 includes various connectors that electrically connect the battery system 10 to the vehicle 2, while various contactors control the release of power from the battery system 10.

As illustrated, the battery system 10 includes a housing 12 with a first battery housing member 14 and a second battery housing member 16. The first and second battery housing members 14, 16 may couple together in a variety of ways including threaded fasteners, welding, etc. to form the housing 12. The battery housing 12 houses a variety of components including battery cells 18 (e.g., 1, 2, 3, 4, 5, 10, 15 or more cells), contactors 20, connectors 22, wires, sensors, etc. that work together to connect the stored electrical energy in the battery cells 18 to various vehicle systems (e.g., AC compressor, motors, heating system) as well as to recharge the battery cells 18 for future use.

The battery housing 12 may include sections/portions that may be integrally formed into the housing 12. The sections/portions may form sub-housings/compartments for various electrical components within the housing 12. As illustrated, the housing 12 includes integral housings/compartments 24, 26. These housings/compartments 24, 26 are at respective ends 28, 30 of the battery system 10. By positioning the housings/compartments 24, 26 at respective ends 28, 30 of the housing 12, the housing 12 may facilitate connection of the battery system 10 to various systems on the electrical vehicle 2. However, in some embodiments the housings/compartments 24, 26 may be positioned at other locations on the housing 12 (e.g., center, sides).

As explained above, the battery cells 18 may optimally operate between 20° C.-35° C. Temperatures above or below this range may negatively affect operation of the battery cells 18. For example, if the battery cells 18 operate in high temperatures the elevated temperatures may decrease the service life of the battery cells 18 (i.e., may more rapidly lose the ability to hold a charge). In contrast, if the battery cells 18 operate in cold temperatures the electrical resistance increases which may reduce performance.

In order to regulate the temperature of the battery cells 18 and increase performance, the vehicle may 4 may include a temperature control system 32. In operation, the temperature control system 32 regulates the temperature of the battery cells 18 by pumping a fluid 34 through the housing 12. The fluid 34 may include, water, coolant, oil, or a combination thereof. The fluid 34 is pumped with one or more pumps 36 through an inlet 38 in the housing 12. Inside the housing 12 the fluid 34 circulates to either warm or cool the battery cells 18 (i.e., regulate the temperature of the battery cells 18). After passing through the housing 12, the fluid 34 exits through outlet 40. In order to heat or cool the fluid 34, the fluid 34 passes through one or more heat exchangers 42. The heat exchangers 42 may be located at various points along the fluid flow path. For example, the heat exchanger 42 may be positioned to exchange energy (e.g., heat or cool) with the fluid stream before it enters the pump 36. In another embodiment, the heat exchanger 42 may exchange energy with the fluid 34 after it exits the pump 36. In some embodiments, the temperature control system 32 may include two heat exchangers 42, one that exchanges energy with the fluid stream before it enters the pump 36 and another that exchanges energy with the fluid stream after it exits the pump 36.

The temperature control system 32 controls the amount of fluid 34 flowing through the housing 12 by controlling the speed of the pump 36 with the controller 44. In some embodiments, the controller 44 may control one or more valves alone or in combination with the pump 36 to regulate the flow of the fluid 34. The controller 44 includes one or more processors 46 that execute instructions stored on one or more memories 48 to control operation of the pump 44. In some embodiments, the controller 44 may also control operation of the heat exchanger 42. For example, the controller 44 may control the operation of valves to increase or limit the flow of another fluid through the heat exchanger 42. In some embodiments, the controller 44 may receive signals from temperature sensors 50 representative of battery cell temperatures. The temperature control system 32 may include multiple temperature sensors 50 (e.g., 1, 2, 3, 4, 5, or more) enabling both targeted and redundant monitoring of the battery cells 18. In response to signals from the temperature sensors 50, the controller 44 controls the speed of the pump to increase or decrease the flow of fluid 34 through the housing 12. Faster fluid flow may result in an increase in energy transfer to or from the fluid 34 to either cool or heat the battery cells 18.

Figure 3:
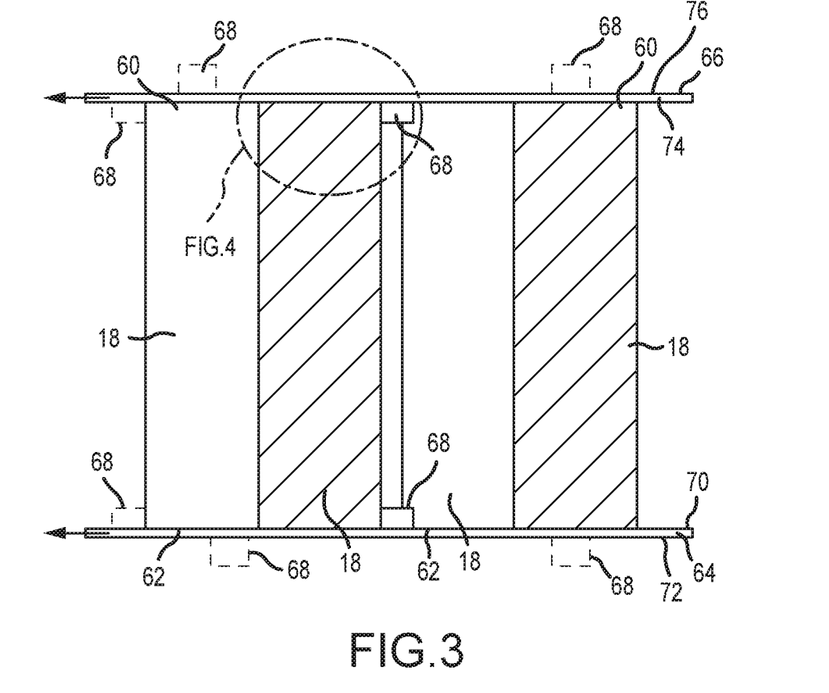
FIG. 3 is a side view of an embodiment of a plurality of battery cells within line 3-3 of FIG. 2.

FIG. 3 is a side view of an embodiment of a plurality of battery cells within line 3-3 of FIG. 2. As illustrated, the battery cells 18 may be cylindrical in shape and form a positive and negative terminal at opposing ends 60, 62. It should be noted that the battery cells 18 may be formed into other shapes as well. In some embodiments, the positive terminal is located at the battery cell end 60 while the negative terminal is located at the battery cell end 62. In another embodiment, the location of the positive and negative terminals may be reversed with the positive terminal located at end 62 and the negative terminal located at end 60. To complete the circuit the positive and negative terminals couple to respective first and second busbars 64, 66. The busbars 64, 66 are made from a conductive material such as aluminum, copper, nickel coated steel, or a combination thereof. In operation, the busbars electrically couple the battery cells 18 together enabling the battery system 10 to combine the electric power of the battery cells 18 before release. In some embodiments, there may be more than two busbars that connect individual and/or groups of battery cells 18 together.

As the battery releases power from the battery cells 18 the internal resistance of the battery cell 18, the resistance of the busbars 64, 66, the ambient temperature surrounding the housing 12 increases the temperature of the battery cells 18. As the temperature of the battery cells 18 increase above a threshold level battery performance may decrease. Similarly if the temperature of the battery cell 18 falls below a threshold temperature battery performance may also decrease. Accordingly, the battery system 10 includes one or more energy transfer conduits 68 (e.g., 1, 2, 3, 4, 5, etc.). These energy transfer conduits 68 carry fluid 34 that may heat and/or cool the battery system 10 by removing heat from or warming the battery cells 18.

The conduits 68 may couple to one or both of the busbars 64, 66. For example, in some embodiments the battery system 10 may include a single energy transfer conduit 68 coupled to the busbar 64. In another embodiment, the battery system 10 may include a single energy transfer conduit 68 coupled to the busbar 66. In some embodiments, a single energy transfer conduit 68 may couple to both the busbars 64, 66. In still another embodiment, each of the busbars 64, 66 may include multiple energy transfer conduits 68. These energy transfer conduits 68 may be integrally formed with or otherwise coupled to the busbars 64, 66 (e.g., weld). When formed or coupled, the energy transfer conduits 68 form a protrusion.

Figure 4:
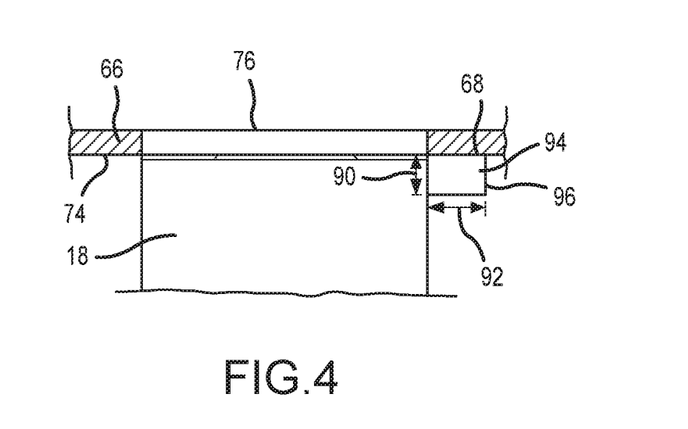
FIG. 4 is a sectional view of an embodiment of a battery cell within line 4-4 of FIG. 3.

As illustrated, busbar 64 defines an interior surface 70 and an exterior surface 72. The busbar 66 likewise defines an interior surface 74 and an exterior surface 76. The energy transfer conduits 68 may couple to the interior surfaces 70, 74 and/or to the exterior surfaces 72, 76. In embodiments where the energy transfer conduits 68 couple to the exterior surfaces 72, 76 the cells 18 may be more densely packed, while embodiments that have conduits coupled to the interior surfaces 70, 74 may decrease the overall thickness of the battery system 10. To increase energy transfer from the cells 18 to the energy transfer conduits 68, the interior surfaces 70, 74 of the busbars 64, 66 may be coated with a thermally conductive resin or layer that increases energy transfer to the busbars 64, 66 which in turn transfer energy to or from the energy transfer conduits 68. The resin may include any desired resin FIG. 4 is a sectional view of an embodiment of a battery cell within line 4-4 of FIG. 3. As illustrated, the energy transfer conduit 68 couples to the interior surface 74 of the busbar 66. In this position, the energy transfer conduit 68 may weave in-between the cells 18 to facilitate energy transfer from the cells 18 and reduce the overall thickness of the battery system 10. In some embodiments, the energy transfer conduit 68 may define a rectangular or square cross-section. However, in some embodiments the cross-section of the energy transfer conduit 68 may be semi-circular, trapezoidal, etc. To reduce the space taken by the energy transfer conduit 68 the length 90 may be greater than the width 92. This enables the energy transfer conduit to extend further between the busbar 64 and the busbar 66 as well as increase the surface area exposed to the cells 18. The length 90 may be any desired length and the width 92 may be any desired width. In some embodiments, the exterior surface 94 of the energy transfer conduit may be coated in a thermally conductive resin or coating 96 that facilitates energy transfer from the cells 18 to the fluid 34 carried in the energy transfer conduit 68.

Figure 5:
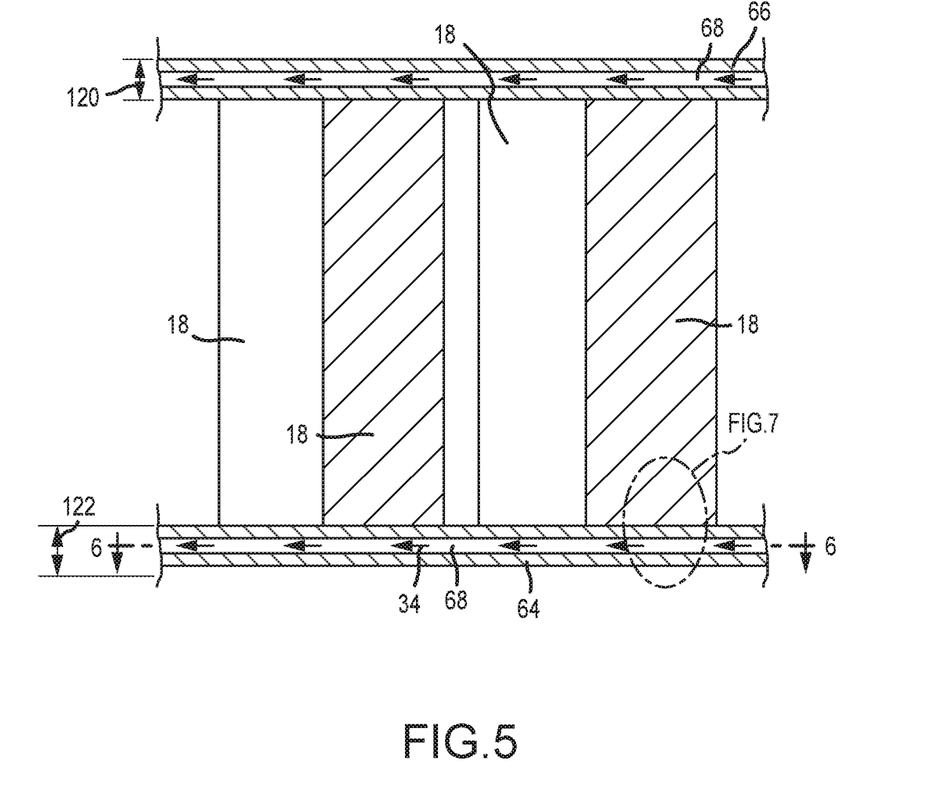
FIG. 5 is a side view of an embodiment of a plurality of battery cells.

FIG. 5 is a side view of an embodiment of a plurality of battery cells 18 coupled to busbars 64, 66. Instead of energy transfer conduits 68 coupled to exterior surfaces of the busbars 64, 66, the energy transfer conduits 68 may extend through the busbars 64, 66. In this way the busbars 64, 66 may have uniform widths 120, 122. As illustrated, the busbars 64, 66 may have the same widths 120, 122, but in other embodiments one of the busbars 64, 66 may have a width 120, 122 greater than the other busbar 64, 66. By increasing the thickness of one of the busbars 64, 66 may accommodate a larger energy transfer conduit 68. For example, the upper busbar (e.g., either busbar 64, 66 depending on orientation) may have a larger width to accommodate a larger energy transfer conduit 68 (e.g., width).

Figure 6:
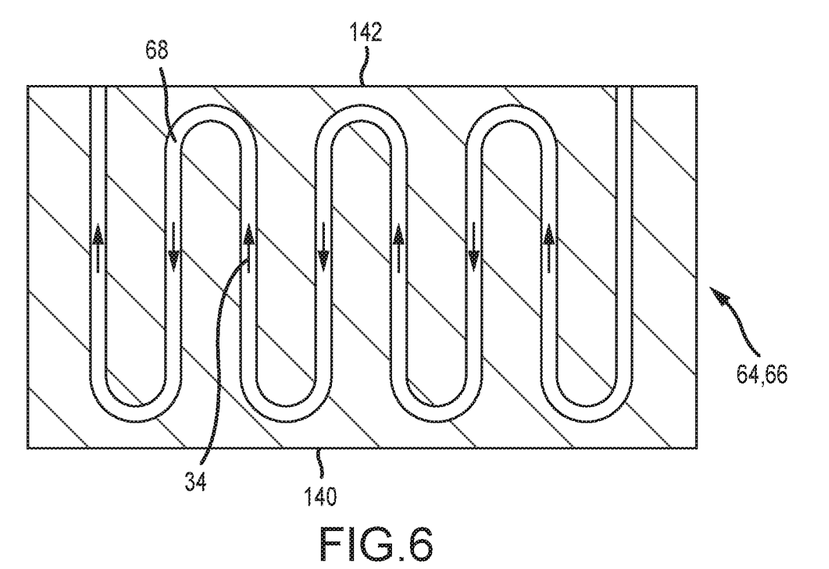
FIG. 6 is a cross-sectional view of an embodiment of a busbar along line 6-6.

FIG. 6 is a cross-sectional view of an embodiment of a busbar 64, 66 along line 6-6. As illustrated, the energy transfer conduit 68 may weave within the busbar 64, 66. However, in other embodiments, there may be a plurality of conduits 68 that extend through the busbar 64, 66 at regular or irregular intervals (e.g., straight, angled). These conduits 68 may be isolated from one another or secondary conduits may fluidly connect them together. In another embodiment, the conduit 68 may extend substantially the entire distance between the sides 140 and 142 of the busbar 64, 66.

Figure 7:
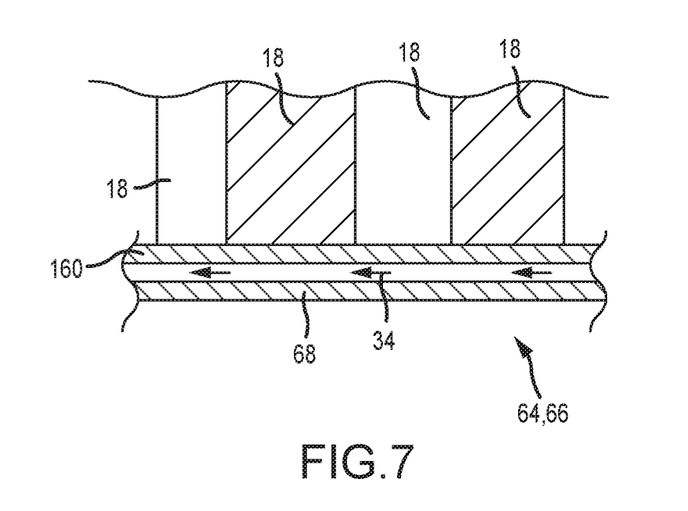
FIG. 7 is a sectional view of an embodiment of a battery cell within line 7-7 of FIG. 5.

FIG. 7 is a sectional view of an embodiment of a battery cell within line 7-7 of FIG. 5. In FIG. 7 a thermally conductive layer 160 (e.g., resin) may be placed over all or a portion of the busbar 64, 66 to facilitate energy transfer from the cells 18 to the busbar 64, 66 which transfers the energy to the fluid 34. Thermally conductive layer 160 may be any desired thickness. The thermally conductive layer 160 may be made out of any desired material. Furthermore, in some embodiments the thermally conductive layer 160 may also be electrically conductive enabling the layer 160 to facilitate electrical connection to the busbars 64, 66.

Figure 8:
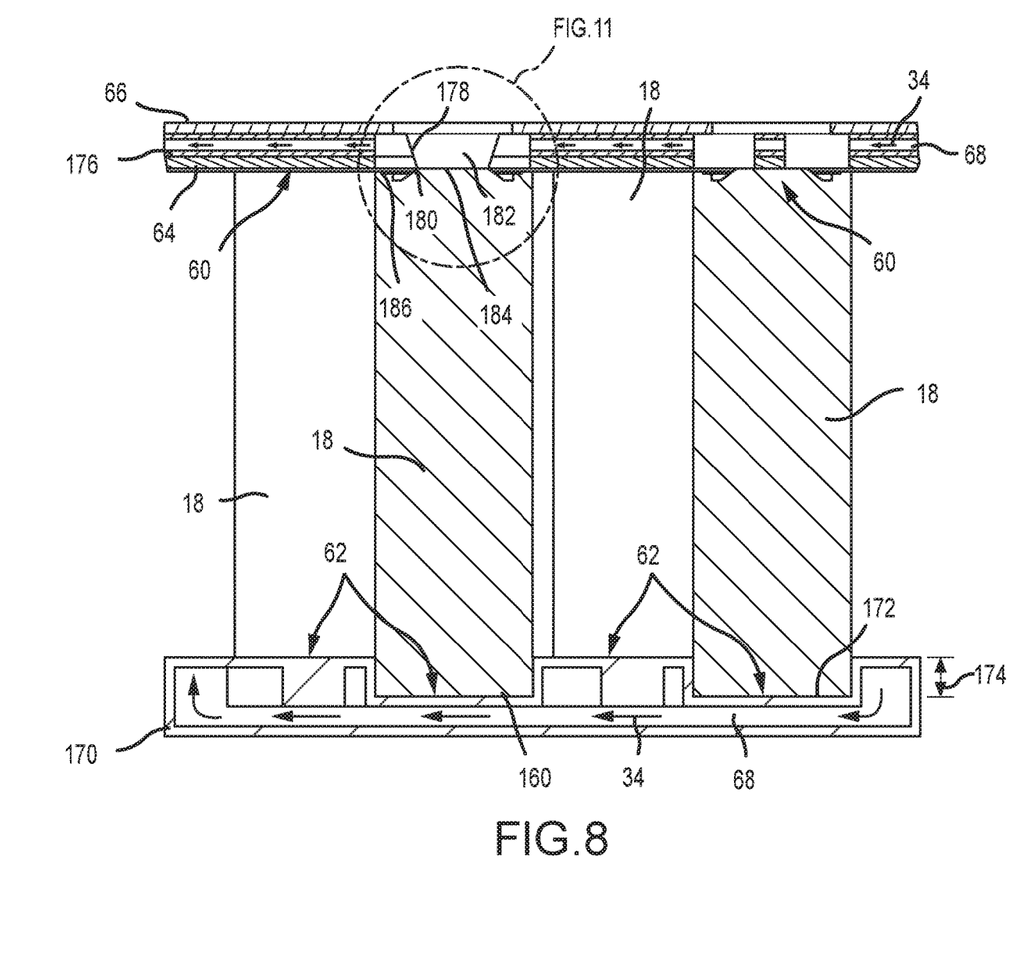
FIG. 8 is a side view of an embodiment of a plurality of battery cells.

FIG. 8 is a side view of an embodiment of a plurality of battery cells 18. In FIG. 8, both busbars 64, 66 are positioned on the same side of the battery cells 18. That is both positive and negative terminals of the battery cell 18 are positioned at the same end (i.e., either end 60 or 62). In this example, the busbars 64, 66 are positioned next to end 60 of the battery cells 18. On the opposite side 62, the battery system 10 includes an energy transfer plate 170 with one or more energy transfer conduits 68. In some embodiments, the energy transfer conduit 68 may weave (e.g., serpentine) within the busbar 64, 66. However, in other embodiments, there may be a plurality of conduits 68 that extend through the energy transfer plate 170 at regular or irregular intervals. These conduits 68 (e.g., primary conduits) may be isolated from one another or secondary conduits may fluidly connect the conduits 68 together. In another embodiment, the conduit 68 may be a chamber that extends substantially the entire length and width of the plate 170.

In operation, a fluid circulates through the energy transfer plate 170 drawing or delivering heat to the battery cells 18 enabling the cells 18 to operate within a temperature range (e.g., optimal temperature range). In some embodiments, the energy transfer plate 170 may include a thermally conductive resin or coating 160 that facilitates energy transfer from the battery cell 18 to the energy transfer plate 170 and as a result to the fluid 34. In some embodiments, the energy transfer plate 170 may define one or more counterbores 172 that receive the ends 62 of the cells 18. The counterbores 172 may have a sufficient depth in order to couple to and stabilize the cells 18. The depth of the counterbores 172 may also facilitate energy transfer by increasing the contact area between the energy transfer plate 170 and the cells 18.

The first and second busbars 64, 66, are electrically isolated from each other with one or more dielectric material layers 176. The dielectric layer 176 may include any desired material. While the dielectric layer 176 is electrically non-conductive, the dielectric layer 176 may be thermally conductive enabling heat transfer between the busbars 64, 66, the cell 18 and the energy transfer plate 170. The dielectric layer 176 defines a plurality of apertures 178 and the first busbar 64 defines a plurality of apertures 180. These apertures 178 and 180 enable protrusions 182 on the second busbar 66 to contact the cell 18 through the dielectric layer 176 and the first busbar 64. Depending on the construction of the cell 18 the protrusion 182 may contact the positive or negative terminal, while the first busbar 64 contacts the opposite terminal. The cell 18 includes first and second terminals 184, 186 these terminals may be either the positive or negative terminal depending on cell 18 construction. As illustrated, the second busbar 66 electrically contacts the first terminal 184 with the protrusion 182, while the first busbar 64 contacts the second terminal 186.

Figure 9:
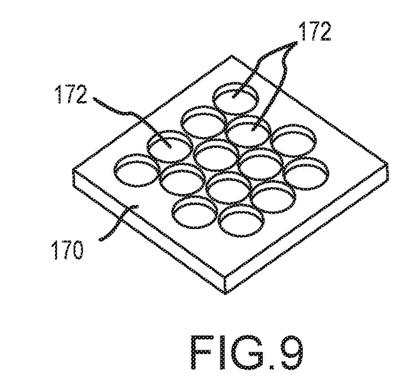
FIG. 9 is a perspective view of a cooling plate.

FIG. 9 is a perspective view of an energy transfer plate 170. As explained above, the energy transfer plate 170 includes multiple counterbores 172 that receive respective cells 18. These counterbores 172 may have the same depth and area. In other embodiments, the counterbores 172 may have different depths and/or different areas to accommodate different sizes of cells 18.

Figure 10:
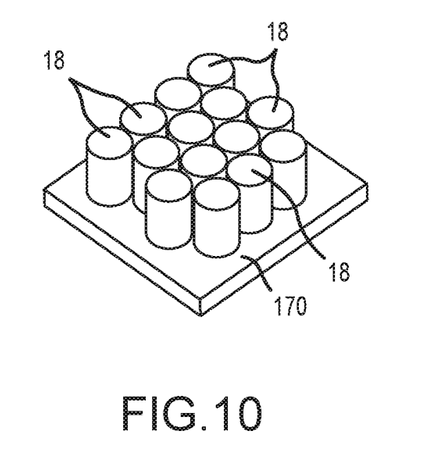
FIG. 10 is a perspective view of a cooling plate with battery cells.

FIG. 10 is a perspective view of the energy transfer plate 170 with battery cells 18. As illustrated, the cells 18 fit within counterbores 172 of the energy transfer plate 170. These counterbores 172 enable the cells 18 to be densely packed while also aligning and supporting the cells 18.

Figure 11:
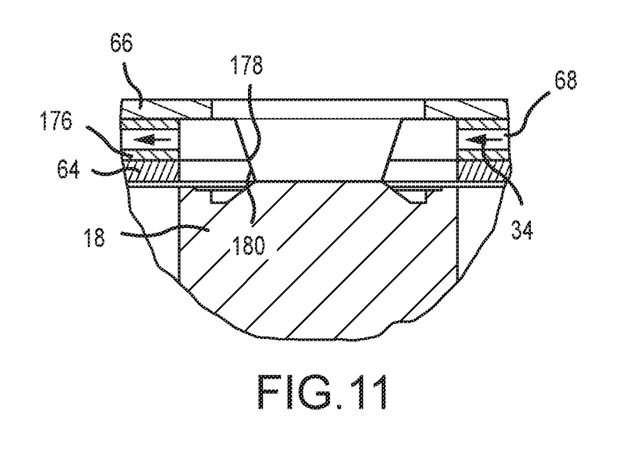
FIG. 11 is a sectional view of an embodiment of a battery cell within line 11-11 of FIG. 8.

FIG. 11 is a sectional view of an embodiment of a battery cell 18 within line 11-11 of FIG. 8. In some embodiments, the dielectric layer 176 may also facilitate energy transfer by including one or more energy transfer conduits 68 that carry the fluid 34. Similar to the discussion above, the energy transfer conduit 68 may weave (e.g., serpentine) within the dielectric layer 176. However, in other embodiments, there may be a plurality of conduits 68 that extend through the dielectric layer 176 at regular or irregular intervals. These conduits 68 (e.g., primary conduits) may be isolated from one another or secondary conduits may fluidly connect the conduits 68 together. In another embodiment, the conduit 68 may be a chamber that extends substantially the entire length and width of the plate 170.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

What is claimed is:

1. A battery system, comprising:
   a plurality of battery cells, wherein each battery cell comprises a proximal end and a distal end;
   a first busbar coupled to the proximal ends of the battery cells, wherein the first busbar has a first busbar portion which extends from the proximal end of a first of the battery cells to the proximal end of a second of the battery cells, and wherein the first busbar is configured to complete an electrical circuit;
   a second busbar coupled to the distal ends of the battery cells, wherein the second busbar has a second busbar portion which extends from the distal end of the first of the battery cells to the distal end of the second of the battery cells, and wherein the second busbar is configured to complete the electrical circuit; and
   a first energy transfer conduit configured to receive a fluid that cools and/or heats the battery cell, wherein the first energy transfer conduit couples to the first busbar or the second busbar along a length of the first busbar portion or the second busbar portion.

2. The battery system of claim 1, wherein the first busbar defines a first side and a second side opposite the first side, and wherein the first side couples to the proximal end of the battery cell.

3. The battery system of claim 2, wherein the first energy transfer conduit couples to the first side of the first busbar.

4. The battery system of claim 2, wherein the first energy transfer conduit couples to the second side of the first busbar.

5. The battery system of claim 1, wherein the second busbar defines a first side and a second side opposite the first side, and wherein the first side couples to the distal end of the battery cell.

6. The battery system of claim 5, wherein the first energy transfer conduit couples to the first side of the second busbar.

7. The battery system of claim 5, wherein the first energy transfer conduit couples to the second side of the second busbar.

8. The battery system of claim 1, comprising a second energy transfer conduit, wherein the first energy transfer conduit couples to the first busbar and the second energy transfer conduit couples to the second busbar.

9. The battery system of claim 1, wherein the first and second busbars comprise copper, aluminum, or steel coated with a layer of nickel.

10. The battery system of claim 1, wherein the first and second busbars comprise a layer of thermally conductive but electrically resistive resin, wherein the resin facilitates heat transfer from the battery cell to the first and second busbars.

11. A battery system, comprising:
    a plurality of battery cells, wherein each battery cell comprises a proximal end and a distal end;
    a first busbar coupled to the proximal ends of the battery cells, wherein the first busbar has a first busbar portion which extends from the proximal end of a first of the battery cells to the proximal end of a second of the battery cells, and wherein the first busbar is configured to complete an electrical circuit;
    a second busbar coupled to the distal ends of the battery cells, wherein the second busbar has a second busbar portion which extends from the distal end of the first of the battery cells to the distal end of the second of the battery cells, and wherein the second busbar is configured to complete the electrical circuit; and
    a first energy transfer conduit configured to receive a fluid that cools and/or heats the battery cell,
    wherein the first busbar or the second busbar comprise the first energy transfer conduit, and
    wherein the first energy transfer conduit extends along a length of the first busbar portion or the second busbar portion.

12. The battery system of claim 11, wherein the first busbar defines a first side and a second side opposite the first side, and wherein the first side couples to the proximal end of the battery cell.

13. The battery system of claim 12, wherein the first energy transfer conduit passes through the first busbar and between the first side and the second side of the first busbar.

14. The battery system of claim 13, wherein the first busbar is flat.

15. The battery system of claim 11, wherein the second busbar defines a first side and a second side opposite the first side, and wherein the first side couples to the distal end of the battery cell.

16. The battery system of claim 15, wherein the first energy transfer conduit passes through the first busbar and between the first side and the second side of the second busbar.

17. The battery system of claim 16, wherein the first busbar is flat.

18. The battery system of claim 11, comprising a second energy transfer conduit, wherein the first busbar comprises the first energy transfer conduit and the second busbar comprises the second energy transfer conduit.

19. The battery system of claim 11, wherein the first and second busbars comprise copper, aluminum, or steel coated with a layer of nickel.

20. The battery system of claim 11, wherein the first and second busbars comprise a layer of thermally conductive but electrically resistive resin, wherein the resin facilitates heat transfer from the battery cell to the first and second busbars.

* * * * *